US008626393B2

(12) United States Patent
Strecker et al.

(10) Patent No.: US 8,626,393 B2
(45) Date of Patent: Jan. 7, 2014

(54) DETERMINATION OF A CENTER FEELING FOR EPS STEERING SYSTEMS

(75) Inventors: Joerg Strecker, Pluederhausen (DE); Thomas Werner, Aalen (DE); Stephan Hiegler, Schwaebisch Gmuend (DE); Manuel Diez Rodriguez, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/456,871

(22) Filed: Apr. 26, 2012

(65) Prior Publication Data

US 2012/0259513 A1    Oct. 11, 2012

Related U.S. Application Data

(63) Continuation of application No. PCT/EP2011/058565, filed on May 25, 2011.

(30) Foreign Application Priority Data

Jun. 10, 2010 (DE) .......................... 10 2010 029 928

(51) Int. Cl.
*B62D 6/00* (2006.01)

(52) U.S. Cl.
USPC ............. 701/41; 180/446; 180/440; 180/444; 318/466

(58) Field of Classification Search
USPC .............. 701/41; 180/446, 440, 444; 318/466
See application file for complete search history.

(56) References Cited

U.S. PATENT DOCUMENTS

| 5,828,972 | A | * | 10/1998 | Asanuma et al. ................ 701/41 |
| 5,845,222 | A | * | 12/1998 | Yamamoto et al. ............. 701/41 |
| 5,908,457 | A | * | 6/1999 | Higashira et al. ............... 701/41 |
| 6,108,599 | A | * | 8/2000 | Yamamoto et al. ............. 701/41 |
| 6,148,951 | A | * | 11/2000 | Nishi et al. ..................... 180/446 |
| 6,239,568 | B1 | * | 5/2001 | Sugitani et al. ................ 318/466 |
| 6,931,313 | B2 | * | 8/2005 | Kato et al. ....................... 701/41 |
| 7,383,111 | B2 | * | 6/2008 | Takimoto et al. ............... 701/41 |
| 7,537,081 | B2 | * | 5/2009 | Matsuda ....................... 180/444 |
| 7,878,295 | B2 | * | 2/2011 | Kato et al. ..................... 180/446 |
| 7,954,593 | B2 | * | 6/2011 | Dornhege et al. ............. 180/446 |
| 8,249,777 | B2 | * | 8/2012 | Greul et al. ..................... 701/41 |
| 2005/0071061 | A1 | * | 3/2005 | Kato et al. ..................... 701/41 |

(Continued)

FOREIGN PATENT DOCUMENTS

| FR | 2 930 505 | 10/2009 |
| JP | 10 2004 060030 | 6/2006 |

(Continued)

*Primary Examiner* — Thomas Black
*Assistant Examiner* — Wae Louie
(74) *Attorney, Agent, or Firm* — Jordan and Hamburg LLP

(57) ABSTRACT

In order to transmit reliable and precise information, to as great an extent as possible, on current driving conditions and driving situations, and also achieve disturbance-free behavior of the steering system in the center point range, in a steering device in a vehicle, a target steering torque (torSSW) is determined by determining an actual toothed rack force (forRT), determining at least one first component for the target steering torque (torSSW) as a function of the actual toothed rack force (forRT), and determining at least one additional component for the target steering torque (torSSW) from a calculated toothed rack force (forRS), wherein the calculated toothed rack force (forRS) is determined from a wheel steering angle and a vehicle speed (velV).

22 Claims, 2 Drawing Sheets

(56) References Cited

U.S. PATENT DOCUMENTS

| | | | |
|---|---|---|---|
| 2006/0064214 A1* | 3/2006 | Takimoto et al. | 701/41 |
| 2006/0086560 A1* | 4/2006 | Furusho et al. | 180/446 |
| 2006/0106516 A1* | 5/2006 | Pick et al. | 701/41 |
| 2007/0289806 A1* | 12/2007 | Matsuda | 180/444 |
| 2008/0294355 A1* | 11/2008 | Berthold et al. | 702/41 |
| 2009/0078494 A1 | 3/2009 | Dornhege et al. | |
| 2009/0112436 A1 | 4/2009 | De Carteret et al. | |
| 2009/0138158 A1 | 5/2009 | Greul et al. | |
| 2011/0000738 A1* | 1/2011 | Horii et al. | 180/446 |
| 2012/0072074 A1* | 3/2012 | Greul et al. | 701/41 |
| 2012/0259513 A1* | 10/2012 | Strecker et al. | 701/41 |

FOREIGN PATENT DOCUMENTS

| | | |
|---|---|---|
| JP | 10 2006 044088 | 4/2008 |
| JP | 10 2007 000995 | 6/2009 |
| JP | 10 2008 053424 | 7/2009 |
| JP | 10 2008 042666 | 5/2010 |
| JP | 10 2009 000638 | 8/2010 |

* cited by examiner

DETERMINATION OF A CENTER FEELING FOR EPS STEERING SYSTEMS

BACKGROUND OF THE INVENTION

The invention relates to a method for determining a target steering torque for a steering means of a steering device in a vehicle.

The invention also relates to a steering device in a vehicle. The invention further relates to a computer program that can be executed on a control unit of a steering device in a vehicle, and to a memory medium on which the computer program is stored.

In modern steering devices, for example in an electric power steering (EPS) system or in what is referred to as a Steer-by-Wire (SbW) steering system, a target steering torque is determined, which is applied to a steering means, for example a steering wheel, in order to counteract or support the force applied by the driver. The target steering torque is frequently generated based on an actual toothed rack force acting on the wheels of the vehicle so as to provide the driver with the appropriate steering assistance. Additionally, further functions may be involved in generating the target steering torque so as to achieve a desired and pleasant steering feel for the driver. A toothed rack force determined by competent methods can provide the forces or force conditions actually present at the front axle of the vehicle, or at the toothed rack. If this force is used as a basis for generating what is referred to as a desired steering torque, the driver generally obtains good feedback on the behavior of the vehicle, or on the conditions of the roadway. In addition to the basic steering torque thus generated, additional functions can be added in a module-like manner so as to provide the desired steering torque.

The generation of a target steering torque based on the actual toothed rack force is dependent on several variables or pieces of information. The road friction value and the current driving condition are some of the factors affecting the toothed rack force. In principle, some of this information is helpful and desired by the driver. Other parts of the information, in contrast, are considered to be disturbing. Put simply, it can be stated that information about variables that influence the straight-ahead position of the vehicle may not be desired by the driver, wherein the particular circumstances may need to be looked in great detail. Moreover, it may be difficult to provide a behavior of the target steering torque which is desired by the driver in the center point range of the steering, while achieving a low-disturbance straight-ahead position of the vehicle.

SUMMARY OF THE INVENTION

It is the object of the present invention to generate an improved "center point feeling" for the driver for steering devices in vehicles comprising electrical power steering (EPS). This is intended to provide the driver with reliable and precise information, to as great an extent as possible, on current driving conditions and driving situations, while also achieving disturbance-free behavior in the center point range.

The object is achieved by a method of the type mentioned above by determining at least one first component for the target steering torque and at least one additional component from a toothed rack force calculated therefor, as a function of an actual toothed rack force acting on the steering device. The actual toothed rack force can advantageously be measured or, for example, determined using an observer or estimator in the known manner, wherein the actual toothed rack force thus determined substantially corresponds to the measured actual toothed rack force.

In the determination of the target steering torque, the individual components can be combined in a suitable manner, for example by way of addition, to form the target steering torque. Regardless of the fact that—as described above—further functions may be involved in generating a target steering torque, hereafter—unless stated otherwise—the term "target steering torque" shall always be understood to mean the contribution calculated according to the invention to a target steering torque which may be changed again by the further functions.

The object is also achieved by a steering device in a vehicle, in that the steering device comprises means for carrying out the method according to the invention. These means are implemented, for example, in the form of a computer program that is executed in a control unit. The control unit is also referred to hereinafter as a "controller."

Advantageous refinements of the invention are provided in dependent claims, the characteristics of which may be significant in terms of the invention both alone and in various combinations, without further explicit reference being made thereto.

The invention has the advantage that a steering device of a vehicle generates a center point feeling that can be perceived by the driver, wherein a good compromise can be achieved between feedback that is felt and robustness to disturbance influences not desired by the driver when driving straight ahead.

According to the invention, the target steering torque that can be perceived by the driver is thus supplemented by a component which is additional as compared to known solutions, and which is not determined from the actual toothed rack force, but rather from a calculated toothed rack force, which in turn is calculated from at least a wheel steering angle and a vehicle speed. The calculated toothed rack force is preferably determined such that it corresponds, at least approximately, to the actual toothed rack force. The center point feeling that can be perceived by the driver is thus significantly improved.

This results in at least two components that determine the target steering torque: at least one first component according to known methods which, proceeding from the actual toothed rack force, makes a contribution to the target steering torque over the entire angular range of the steering. And secondly, the additional component which, proceeding from the calculated toothed rack, force makes a variable contribution only in the center point range of the steering device. Moreover, both components can be made dynamically dependent on the steering movement and/or the vehicle movement, and notably on the vehicle speed, which can, for example, be used as a parameter.

According to one embodiment of the method, the additional component is variable only within an angular range around the straight-ahead position of the steering device and/or within a range of a transverse acceleration, and otherwise takes on a fixed value. It can thus be assured that the steering device can react in the known manner outside the center point range.

The range of the transverse acceleration notably is approximately $$-1,5\frac{m}{s^2} \text{ to } +1,5\frac{m}{s^2}.$$

The fact that the validity of the additional component, which is substantially determined from the wheel steering angle and the vehicle speed, decreases for larger transverse accelerations of the toothed rack steering the wheels can then be used as an empirical value.

On a supplemental basis, the additional component is variable only within the range of the calculated toothed rack force, and otherwise takes on a fixed value. This prevents the additional component from accidentally and undesirably influencing the target steering torque, beyond the intended function thereof.

The method can be better adapted to requirements if the calculated toothed rack force is calculated from the wheel steering angle and the vehicle speed using a model. This creates the option of individually weighting input variables that characterize the wheel steering angle and the vehicle speed, or of adapting them to the respective requirements by way of mathematical functions, for example non-linearities.

According to the invention, the model additionally takes design-induced variables of the vehicle and/or operation-induced variables of the vehicle into consideration. These variables can thus be used on a supplemental basis, within the aforementioned validity range of the additional component, so as to influence the additional component by means of a mathematical operation.

Additional characteristics, possible applications and advantages of the invention will be apparent from the following description of exemplary embodiments of the invention, which will be described based on the drawings, wherein the characteristics can be significant in terms of the invention both alone and in various combinations, without further explicit reference being made thereto.

DESCRIPTION OF THE PREFERRED EMBODIMENTS

Figure 1:
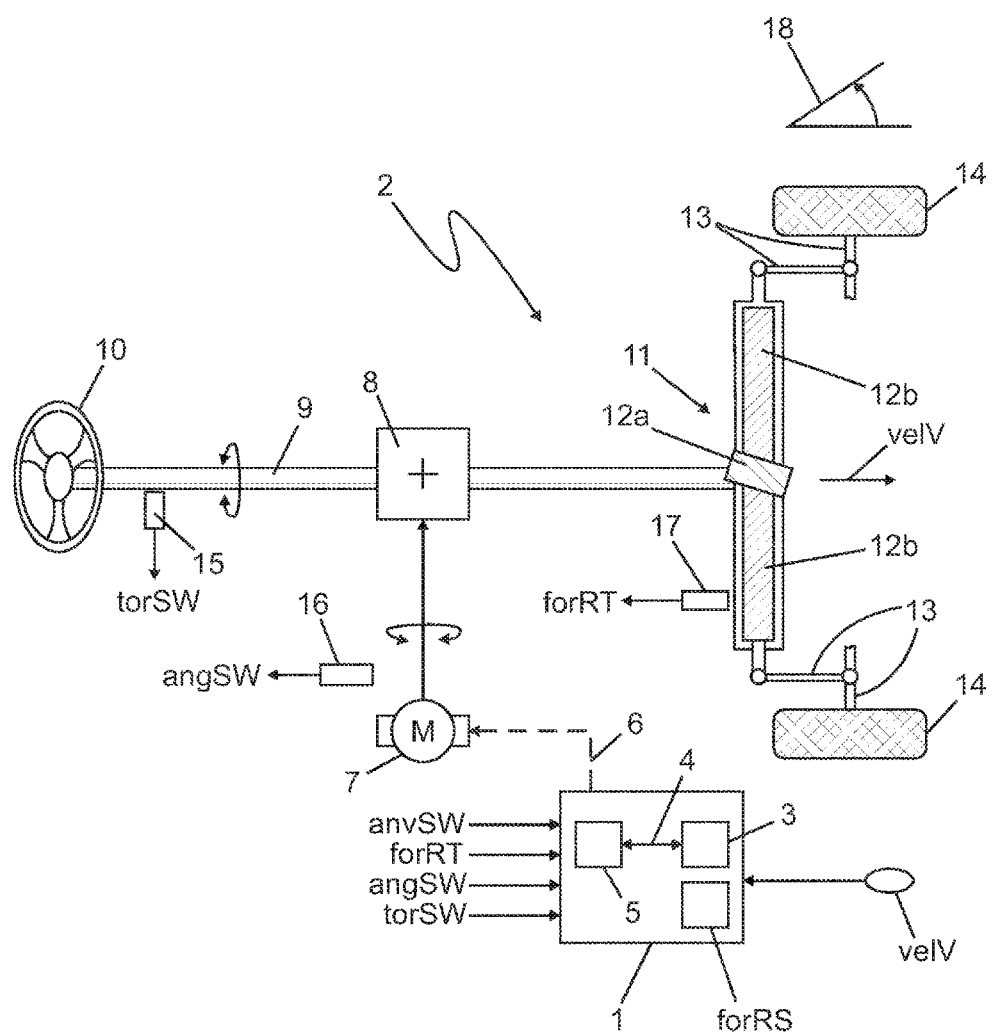
FIG. 1 shows a steering device comprising a control unit for carrying out the method according to the invention.

FIG. 1 shows a control unit which is referred to hereinafter as the controller 1 and is associated with a steering device 2. A microprocessor 3 is disposed in the controller 1 and is connected via a data line 4, such as a bus system, to a memory medium 5. The controller 1 is connected, via a signal line 6, to a motor 7, such as an electric motor, allowing for control of the power of the motor 7 by the controller 1. The motor 7 acts on a torsion bar 9 via a transmission 8. A steering means 10, which in the present example is designed as a steering wheel, is disposed on the torsion bar 9 and can be used to apply a torque to the torsion bar 9 as a result of a driver actuating the steering means 10.

The steering device 2 moreover comprises a steering gear 11, which is designed, for example, as a rack-and-pinion steering gear. The steering gear 11 can further be designed as a ball-and-nut gear or recirculating-ball gear. The description hereafter primarily assumes a rack-and-pinion steering gear, to the extent necessary, in which the steering gear 11 comprises a pinion 12a and a toothed rack 12b. The steering gear 11 is connected to the wheels 14, for example, by way of the pinion 12a and the toothed rack 12b and by a steering linkage 13. The wheels 14 can have a wheel steering angle 18 in relation to a central position, which corresponds to the vehicle driving straight ahead. The drawing of FIG. 1 further shows a vehicle speed velV.

The steering device 2 further comprises a torque sensor 15 for detecting an actual steering torque torSW and a sensor 16 for detecting a steering wheel angle angSW. In the exemplary embodiment shown in FIG. 1, the sensor 16 is associated with the motor 7, so that the sensor 16 detects a rotor angle of the motor 7. This angle corresponds to the steering wheel angle angSW (potentially with the exception of a factor that denotes a gear ratio) because the motor 7 cooperates with the torsion bar 9, and thus with the steering means 10, via the transmission 8. The steering wheel angle angSW can also be detected by means of a sensor that is associated with the steering means 10 or the torsion bar 9. The sensor 16 disposed on the motor 7, however, can achieve a higher resolution by detecting the rotor angle.

According to a possible embodiment, the steering device 2 comprises a sensor 17, which can be used to determine an actual toothed rack force forRT. According to other possible embodiments, the toothed rack force forRT is determined using other known methods, for example by means of an observer or estimator. The toothed rack force forRT is transmitted to the controller 1.

According to the invention, a calculated toothed rack force forRS is used in addition to the actual toothed rack force forRT acting on the wheels 14. The toothed rack force forRS is likewise preferably calculated by means of the controller 1.

The actual steering torque torSW detected by means of the torque sensor 15 and the steering wheel angle angSW detected by means of the sensor 16 are likewise transmitted to the controller 1. Moreover, the current vehicle speed velV is transmitted to the controller 1 or is calculated there based on other variables. A steering speed anvSW is also supplied to the controller 1. The steering speed anvSW denotes the rotational speed by which the steering means 10, and thus the torsion bar 9, are actuated. The steering speed anvSW can be captured by means of a suitable sensor, for example at the torsion bar 9. It is also possible for the steering speed anvSW to be found in the controller 1, for example as a function of the existing steering wheel angle angSW and the time.

Figure 2:
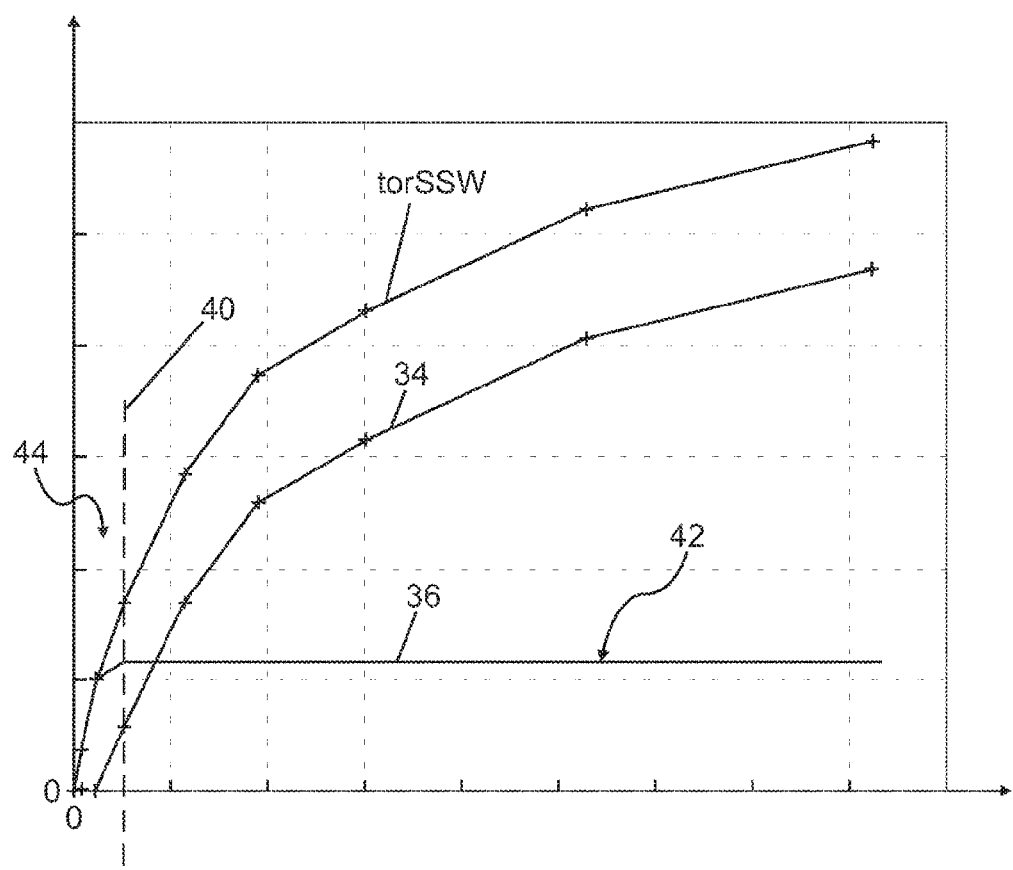
FIG. 2 is a diagram including a base torque, a component for a center point feeling, and a target steering torque.

The operating principle of the method for determining a target steering torque torSSW (wherein here, as mentioned above, any influence of further functions on the target steering torque remains without consideration), which is executed in the controller 1, is shown based on the diagram in FIG. 2. The method can advantageously be realized in the form of a computer program, in which the functionalities required for determining the calculated toothed rack force forRS are suitably implemented. The computer program is stored, for example, in the memory medium 5 and is executed on the microprocessor 3 of the controller 1.

FIG. 2 shows, by way of example, the minimum components to be used according to the invention for determining the target steering torque torSSW. To this end, a base torque 34, a component 36 for a center point feeling, and the target steering torque torSSW determined by adding the base torque 34 and the component 36 are plotted in FIG. 2. The base torque 34 is determined relative to the actual toothed rack force forRT, and the component 36 is determined relative to the calculated toothed rack force forRS, wherein the ordinate of the diagram shown in FIG. 2 corresponds to the respectively used toothed rack force. The curves of the base torque 34 and of the component 36 for the center point feeling start at the origin of the diagram shown in FIG. 2. FIG. 2 shows only one steering direction (for example to the left); the other steering direction (to the right) is derived by mirroring the curves shown in the diagram on the ordinate.

According to the exemplary embodiment shown in FIG. 2, the target steering torque torSSW is calculated from the base torque 34 and from the component 36 for the center point feeling, by way of addition. The component 36 for the center point feeling is determined in the present case as a function of a vehicle model, which includes the wheel steering angle 18 and the vehicle speed velV as input variables. The base torque 34 thus represents a first component based on the actual toothed rack force forRT, and the component 36 represents an additional component based on the calculated toothed rack force forRS for determining the target steering torque torSSW.

In the exemplary embodiment shown in FIG. 2, there is no impact on the base torque 34 if the amounts of the actual toothed rack force forRT are small. That is to say, forces acting on the steering device 2 due to imperfections of the chassis, the wheels 14 or the roadway cannot be noticed by the driver of the motor vehicle via the steering means 10. This range of the toothed rack force forRT not noticeable to the driver may comprise, for example, a range of −300 N to +300 N (newton).

To this end, the component 36 is determined such that the resulting target steering torque torSSW exhibits the steep rise, shown in FIG. 2, in an area surrounding the zero point identified in the diagram, even with very low toothed rack forces. If the toothed rack force is increased beyond a limit amount 40, which in the drawing in FIG. 2 is represented by a vertical dotted line, the component 36 remains constant and thus takes on a fixed value 42. The limit amount 40 also characterizes an angular range 44 for the wheel steering angle 18 and the limit of the validity of an underlying toothed rack force model of the diagram in FIG. 2. According to one embodiment, the toothed rack force model is considered to be valid for a transverse acceleration of up $$\pm 1,5 \frac{m}{s^2}.$$

The diagram in FIG. 2 shows the represented variables for a certain vehicle speed velV. The base torque 34 can be adapted to changing vehicle speeds using known methods. The component 36 for the center point feeling is also dependent on the vehicle speed velV. The curves shown in the diagram are parameterized in a suitable manner for this purpose.

By suitably modeling and/or weighting the base torque 34 and the component 36 for the center point feeling that is added thereto, the resulting target steering torque torSSW can be appropriately adjusted in relation to the toothed rack force. This creates a compromise between a desirable robustness to, for example, imperfections in the center point range induced by the chassis, the wheels or the roadway, and roadway feedback and vehicle feedback that reflect reality in the entire driving range, including in the limit range. This compromise achieves an improved center point feeling and also good feedback outside the center point range.

The invention claimed is:

1. A method for determining a target steering torque (torSSW) for a steering means of a steering device in a vehicle, in which an actual toothed rack force (forRT) is determined, and in which at least one first component for the target steering torque (torSSW) is determined as a function of the actual toothed rack force (forRT), at least one additional component is determined for the target steering torque (torSSW), wherein the additional component is determined from a calculated toothed rack force (forRS), and wherein the calculated toothed rack force (forRS) is determined from at least a wheel steering angle and a vehicle speed (velV), and wherein the additional component makes a variable contribution to the target steering torque (forSSW) only in a center point range of the steering device, and otherwise takes on a fixed value.

2. The method according to claim 1, wherein the additional component is variable only within an angular range around the straight-ahead position of the steering device and/or within a range of a transverse acceleration.

3. The method according to claim 2, wherein the range of the transverse acceleration is approximately $$-1,5 \frac{m}{s^2} \text{ to } 1,5 \frac{m}{s^2}.$$

4. A method according to claim 1, wherein the additional component is variable only within a range of the calculated toothed rack force (forRS), and otherwise takes on a fixed value (42).

5. A method according to claim 1, wherein the calculated toothed rack force (forRS) is determined from the wheel steering angle and the vehicle speed (velV) using a model.

6. The method according to claim 5, wherein the model additionally takes design-induced variables of the vehicle and/or operation-induced variables of the vehicle into consideration.

7. A method for determining a target steering torque (torSSW) for a steering means of a steering device in a vehicle for a center point range of steering while achieving a minimal-disturbance straight ahead position of the vehicle, comprising:
   determining an actual toothed rack force (forRT);
   calculating a calculated toothed rack force (forRS) from at least a steering wheel angle and a vehicle speed (velV);
   determining at least one first component for the target steering torque (torSSW) as a function of the actual toothed rack force (forRT);
   determining at least one additional component for the target steering torque (torSSW) from at least the calculated toothed rack force (forRS), said determining the at least one additional component is not based on said actual toothed rack force (forRT), said at least one additional component making a variable contribution to the target steering torque (forSSW) in a center point range of the steering device, and making a fixed contribution otherwise; and
   adding the at least one first component and the at least one additional component to attain said target steering torque (torSSW); and
   wherein said minimal-disturbance straight ahead position of the vehicle is achieved for the center point range of steering due to said at least one additional component making a variable contribution to the target steering torque (forSSW) in a center point range of the steering device, and making a fixed contribution otherwise.

8. The method of claim 7, wherein said calculating a calculated toothed rack force (forRS) comprises calculating a calculated toothed rack force (forRS) from at least the steering wheel angle and the vehicle speed (velV) based on a model which evaluates transverse acceleration of the vehicle.

9. The method of claim 7, wherein said calculating the calculated toothed rack force (forRS) comprises calculating the calculated toothed rack force (forRS) using a model based on the wheel steering angle and the vehicle speed (velV).

10. The method of claim 9, wherein said model is also based on design-induced variables of the vehicle for said vehicle model.

11. The method of claim 9, wherein said model is also based on operation-induced variables of the vehicle for said vehicle model.

12. The method of claim 7, wherein said determining the at least one first component results in zero contribution to said target steering torque (torSSW) when said actual toothed rack force (forRT) has an amplitude that is less than a first threshold value.

13. The method of claim 7, wherein for a given vehicle speed (velV) when said calculated toothed rack force (forRT) has an amplitude that is greater than a second threshold value, said at least one additional component has a fixed value.

14. The method of claim 7, wherein said at least one additional component is variable only within an angular range around a straight-ahead position of the steering device and/or within a range of a transverse acceleration.

15. The method of claim 14, wherein the range of the transverse acceleration is approximately $-1,5$ m/s$^2$ to $1,5$ $m/s^2$.

16. The method of claim 7, wherein said at least one additional component is variable only within a range of the calculated toothed rack force (forRS), and otherwise takes on a fixed value.

17. The method of claim 7, wherein said determining the actual toothed rack force (forRT) comprises sensing the actual toothed rack force (forRT).

18. The method of claim 7, wherein said determining the actual toothed rack force (forRT) comprises estimating the actual toothed rack force (forRT).

19. A non-transient computer-readable recording medium storing a computer program for determining a target steering torque (torSSW) for a steering means of a steering device in a vehicle for a center point range of steering while achieving a minimal-disturbance straight ahead position of the vehicle, said computer program being configured to cause a controller of a steering system, including said steering device, to perform functions comprising:
  determining an actual toothed rack force (forRT);
  calculating a calculated toothed rack force (forRS) from at least the steering wheel angle and the vehicle speed (velV) based on a model which evaluates lateral acceleration of the vehicle;
  determining at least one first component for the target steering torque (torSSW) as a function of the actual toothed rack force (forRT);
  determining at least one additional component for the target steering torque (torSSW) from at least the calculated toothed rack force (forRS), said determining the at least one additional component is not based on said actual toothed rack force (forRT), said at least one additional component making a variable contribution to the target steering torque (forSSW) in a center point range of the steering device, and making a fixed contribution otherwise; and
  adding the at least one first component and the at least one additional component to attain said target steering torque (torSSW); and
  wherein said minimal-disturbance straight ahead position of the vehicle is achieved for the center point range of steering due to said at least one additional component making a variable contribution to the target steering torque (forSSW) in a center point range of the steering device, and making a fixed contribution otherwise.

20. A steering system for a vehicle, comprising:
  a steering device having a steering wheel;
  a steering system motor for applying a target steering torque (torSSW) to the steering device; and
  a controller that performs functions for determining a target steering torque (torSSW) for the steering device for a center point range of steering while achieving a minimal-disturbance straight ahead position of the vehicle, the functions comprising:
    determining an actual toothed rack force (forRT);
    calculating a calculated toothed rack force (forRS) from at least the steering wheel angle and the vehicle speed (velV) based on a model which evaluates lateral acceleration of the vehicle;
    determining at least one first component, for the target steering torque (torSSW) as a function of the actual toothed rack force (forRT);
    determining at least one additional component for the target steering torque (torSSW) from at least the calculated toothed rack force (forRS), said determining the at least one additional component is not based on said actual toothed rack force (forRT), said at least one additional component making a variable contribution to the target steering torque (forSSW) in a center point range of the steering device, and making a fixed contribution otherwise; and
    adding the at least one first component and the at least one additional component to attain said target steering torque (torSSW); and
    wherein said minimal-disturbance straight ahead position of the vehicle is achieved for the center point range of steering due to said at least one additional component making a variable contribution to the target steering torque (forSSW) in a center point range of the steering device, and making a fixed contribution otherwise.

21. The steering system of claim 20, and wherein the controller receives as inputs the actual steering torque, the actual toothed rack force, the vehicle speed, and the steering wheel angle.

22. The steering system of claim 21, and wherein the controller further receives as inputs a steering speed.

* * * * *